United States Patent
Carney et al.

(10) Patent No.: US 6,658,498 B1
(45) Date of Patent: Dec. 2, 2003

(54) METHOD, SYSTEM, PROGRAM, AND DATA STRUCTURES FOR RECONFIGURING OUTPUT DEVICES IN A NETWORK SYSTEM

(75) Inventors: Dennis Michael Carney, Louisville, CO (US); Ryan Hoa Nguyen, Westminster, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/457,268

(22) Filed: Dec. 8, 1999

(51) Int. Cl.[7] .................................................. G06F 3/00
(52) U.S. Cl. ........................................... 710/8; 709/220
(58) Field of Search ................................ 710/8–10, 12; 709/220–222

(56) References Cited

U.S. PATENT DOCUMENTS

| | | | | |
|---|---|---|---|---|
| 5,247,683 A | * | 9/1993 | Holmes et al. ............. | 709/221 |
| 5,649,105 A | * | 7/1997 | Aldred et al. .............. | 709/220 |
| 5,905,906 A | * | 5/1999 | Goffinet et al. ............ | 358/1.15 |
| 5,999,990 A | * | 12/1999 | Sharrit et al. ............... | 709/103 |
| 6,172,991 B1 | * | 1/2001 | Mori .......................... | 370/474 |
| 6,243,774 B1 | * | 6/2001 | Eide et al. .................. | 710/302 |
| 6,263,387 B1 | * | 7/2001 | Chrabaszcz ................ | 709/220 |
| 6,301,012 B1 | * | 10/2001 | White et al. ............... | 358/1.15 |
| 6,311,232 B1 | * | 10/2001 | Cagle et al. ................ | 710/10 |
| 6,373,585 B1 | * | 4/2002 | Mastie et al. .............. | 358/1.13 |
| 6,385,668 B1 | * | 5/2002 | Gaddess et al. ............ | 370/254 |

* cited by examiner

Primary Examiner—Jeffrey Gaffin
Assistant Examiner—Eron Sorrell
(74) Attorney, Agent, or Firm—Konrad Raynes Victor & Mann LLP

(57) ABSTRACT

Disclosed is a method, system, program, and data structures for configuring output device resources including device objects, output devices, and logical interfaces to the output devices. Jobs directed to a device object are submitted to one associated output device over a network. At least one output device is associated with each device object by associating the device object with the logical interface to the output device, comprising. A file is received including a plurality of entries, wherein each entry indicates a network address of one output device. Each entry in the file is processed to create a logical interface to the output device at the network address indicated in the entry.

33 Claims, 7 Drawing Sheets

The Printer Ports window

The Installing Print Monitor window

The Printer Ports window immediately after installation

The New Port Options window

METHOD, SYSTEM, PROGRAM, AND DATA STRUCTURES FOR RECONFIGURING OUTPUT DEVICES IN A NETWORK SYSTEM

CROSS-REFERENCE TO RELATED APPLICATIONS

This application is related to the co-pending and commonly-assigned patent application, filed on the same date herewith, entitled "Method, System, And Program For Reconfiguring Logical Printers in a Network Printing System," having application Ser. No. 09/457,150, and which is incorporeatd herein by herein in its entirety.

BACKGROUND OF THE INVENTION

1. Field of the Invention

The present invention relates to a method, system, program, and data structures for reconfiguring output devices in a network system.

2. Description of the Related Art

Network printing systems generally comprise an assemblage of different printers, client computers, servers, and other components connected over a network. A network administrator or user may want to monitor the status of print jobs being printed or the general operational status of the printer. A computer may monitor a remote printer over a network using a network protocol, such as SNMP or TCP/IP, or a line connection such as a parallel port connection.

In a Microsoft Windows NT environment, a client application interfaces with a printer object, also known as a logical printer.** The printer object is a software interface to which a driver, output port, and configuration settings are associated. The port provides an interface to a physical printer, which may be a serial, parallel, or network printer. One printer object can be associated with multiple ports. In such case, when submitting a print job to a print object with multiple ports, one of the ports is selected to handle the job.

The client submits a print job, specifying a print object for the print job, to a spooler. The spooler may queue multiple print jobs. When processing a print job, the spooler would determine an available port for the print object, which may have multiple ports. Associated with every port is a port monitor program, such as Local, Macintosh, HP, and line printer daemon protocol (LPR). The LPR port monitor uses the TCP/IP protocol and is typically used to transmit print jobs to network printers over a TCP/IP network. The spooler submits the job to the port monitor for the port. The LPR port monitor maintains information on the IP address or host name of the printers attached to the ports. When the spooler submits the job to one port associated with the printer object, the LPR port monitor submits the job over the network to the printer device having the IP address associated with the port the spooler selected. If multiple ports are associated with a single printer object, then the spooler may select another port if a previous selected port for the print job failed.

In order to add network printers at a new IP address, the network administrator would have to create a port interfacing with the physical printer at the IP address and then associate logical printer objects with that port to print to the new printer. To accomplish this operation for each port to add for a new printer or for each printer object to associate with a different port, the network administrator would have to proceed through multiple graphical user interface (GUI) windows. To add a port, the user would have to perform several GUI actions to first add a network port and enter a network IP address or host name of the printer. For instance, the user would right click the mouse over the printer object shown in FIG. 1a, e.g., "Network Printer," choose "Properties" out of the pop-up menu, and then choose the Ports Tab. The user would then select the "Add Port" button in FIG. 1b. Selection of this button causes the spooler to call the port monitor to put up the Add Port window in which the user may add a port, which includes specifying an IP address of a network printer in the system. After adding the port, the port monitor returns control to the spooler which then updates internal data structures to reflect the added port and returns to FIG. 1b. Upon control returning to FIG. 1b, the user may then associate the printer object selected in FIG. 1a, i.e., that was the target of the right click operation, with a port, which may be the new port.

In large network environments there may be hundreds of printers. Thus, in order to add ports for new network devices or configure network printers to use certain ports, the network administrator would have to go through the above described GUI steps to add a port for a new device. Still further GUI operations would have to be performed to change the port to which the each printer is associated. Moreover, in order to verify a particular configuration, the network administrator would have to go through numerous GUI windows for each printer to verify the configuration.

Thus, there is a need in the art for an improved method, system, program, and data structures to associate new port monitors with printer objects.

SUMMARY OF THE PREFERRED EMBODIMENTS

To overcome the limitations in the prior art described above, preferred embodiments disclose a method, system, program, and data structures for configuring output device resources including device objects, output devices, and logical interfaces to the output devices. Jobs directed to a device object are submitted to one associated output device over a network. At least one output device is associated with each device object by associating the device object with the logical interface to the output device. A file is received including a plurality of entries, wherein each entry indicates a network address of one output device. Each entry in the file is processed to create a logical interface to the output device at the network address indicated in the entry.

In additional embodiments, each entry further indicates one device object. In such case, processing each entry in the file further comprises associating the device object indicated in the entry with the logical interface created for the entry.

In further embodiments, processing each entry in the file further comprises determining whether there is a preexisting logical interface to the output device indicated in the entry before creating the logical interface to the output device. In such case, the logical interface is not created if there is a preexisting logical interface to the output device indicated in the entry.

In yet further embodiments, all the logical interfaces are created before associating the logical interfaces with the device objects.

In printer embodiments, the output device comprises a printer, the logical interface comprises a printer port, and the device object comprises a logical printer. Alternatively, the output device may comprise any output device known in the art, such as printers, facsimile machines, copiers, telephones, display devices, input/output devices, storage devices, communication systems, etc.

Preferred embodiments provide a mechanism for automatically reconfiguring multiple output devices, such as printers, in a network system. In prior art printer managements systems, such as the Microsoft Windows NT server, the network administrator would have to proceed through a series of GUI panels to separately add a port for to the system for a specified IP address and then go through further GUI panels to associate the added port to a printer object. This process can be especially tedious if the network administrator needs to add numerous, perhaps hundreds, of new printers or reconfigure the port monitors or ports to which logical printer objects are associated. With the preferred embodiments, the user need only create a file including entries for the new ports to add for the new printers as well as other information, and the port monitor program will automatically add all the ports and possibly create associations between existing printer objects and the new ports. Preferred embodiments obviate the need for the network administrator to use the GUI panels to separately add each port, reconfigure logical objects, and delete obsolete ports that would otherwise require the network administrator or user to change settings on numerous GUI panels for each port or logical object being reconfigured.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 2:
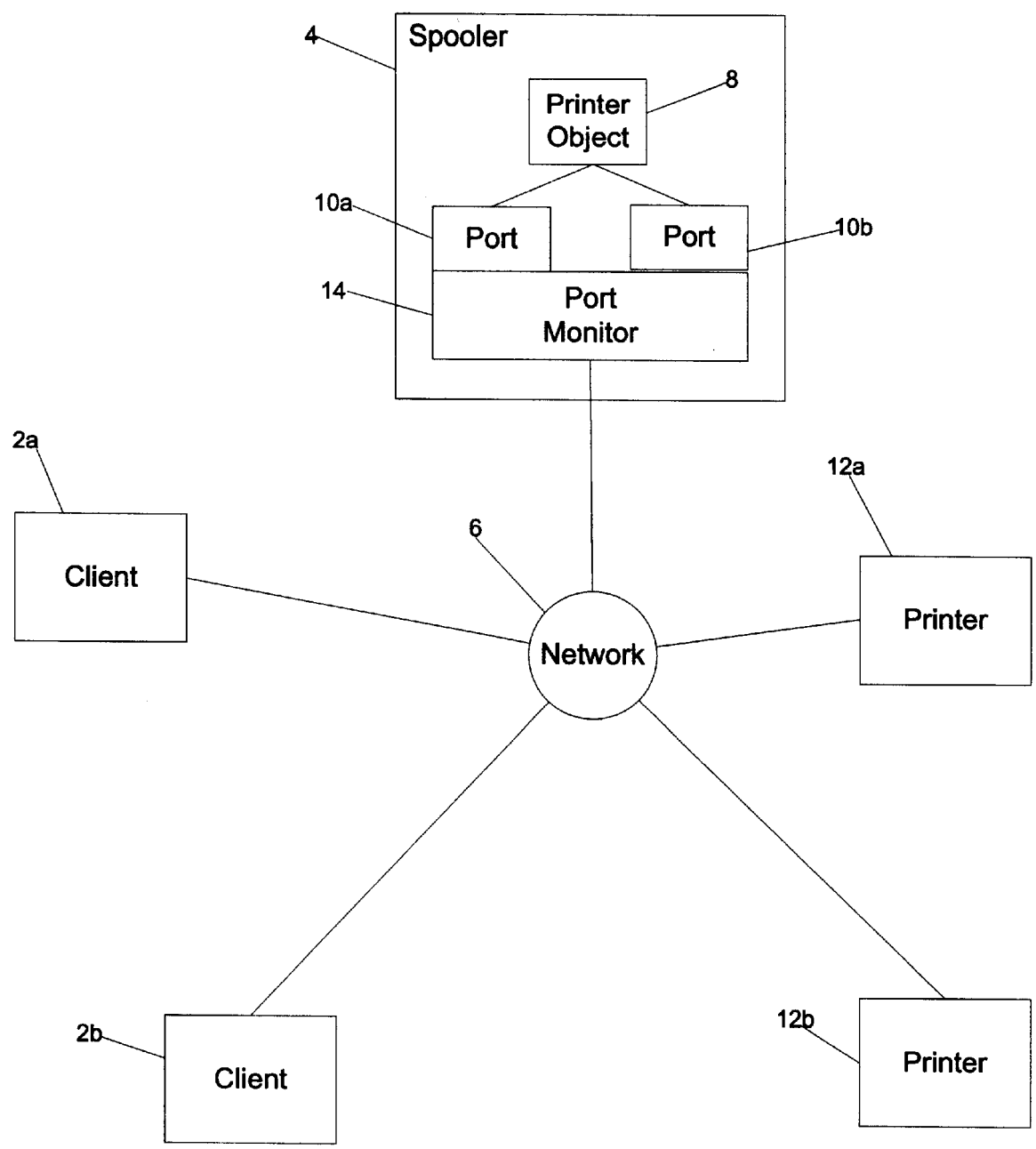
FIG. 2 is a block diagram illustrating a network computing environment in which preferred embodiments of the present invention are implemented.

FIG. 2 illustrates a network computing environment in which preferred embodiments are implemented. Client computers 2a, b, which may comprise any computing device in the art, would submit a print job to a logical printer represented by a print object. The clients 2a, b submit the print job to a spooler 4, which may be implemented in a server, such as a Microsoft Windows NT system. The spooler 4 queues print jobs submitted to each printer object. Print jobs are communicated over a network 6, which in preferred embodiments utilizes a TCP/IP protocol to communicate between devices. FIG. 2 shows the spooler 4 as having only one printer object 8, when in fact the spooler 4 may maintain multiple printer objects. The printer object 8 comprises the representation of a logical printer in the system to which applications running in the clients 2a, b print. Each printer object 8 is associated with one or more ports 10a, b. As discussed, the ports provide a representation of the physical connection to an actual printer. Thus, ports 10a, b represent the connection between the printer object 8 and printers 12a, b, respectively. Each port is associated with a port monitor 14. The port monitor 14 is a program that submits the print job to the printer 12a, b associated with the port the spooler 4 selects for printing. The port monitor 14 may also manage and monitor communication with the printer 12a, b, including monitoring the progress of submitted print jobs. FIG. 2 shows one port monitor 14 for both ports 10a, b. However, in alternative embodiments each port for a printer object 8 can have different port monitors associated with it. The port monitor 14 may comprise the IBM TCP/IP Network Port Monitor described in the copending and commonly assigned patent application entitled "Method, System, and Program for Monitoring a Device with a Computer Using User Selected Monitoring Settings," having U.S. patent Ser. No. 09/348,358 and filed on Jul. 7, 1999 or comprise any other port monitor program known in the art.

Preferred embodiments are implemented in a Microsoft Windows network environment, wherein the spooler 4 is implemented in a Microsoft Windows NT print server, e.g., an NT workstation or server, and the clients 2a, b utilize Microsoft Windows 95/98 or NT.

Preferred embodiments provide an improved method, system, program, and data structures for automatically adding numerous printers, ports for the added printers, migrating printer objects to a new port, and/or deleting old ports. In this way, the preferred embodiments could migrate current specified printers to use different ports, including new ports just added.

Figure 3:
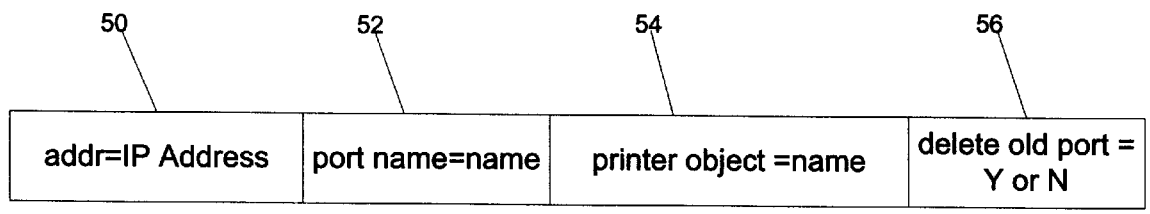
FIG. 3 illustrates data that may be included in entries of the operation file used to configure printers in accordance with preferred embodiments of the present invention.

With preferred embodiments, the user would create an operation file, which may comprise a text file, that includes information for all the operations the port monitor 14 is to perform with respect to multiple physical printers, ports, printer objects, etc. In this way, the user may define configuration settings in the operation file that could reconfigure numerous elements in the printing system. The operations file is comprised of a plurality of entries, each entry including fields of information on printers and ports to reconfigure. FIG. 3 illustrates key word pairs that may be included in each entry in the operations file. The address 50 would provide the IP address or host name of the physical output device, e.g., printer, for which a port is being created; the port name 52 indicates a name to provide to the port created for the physical device indicated in the address field 50; the printer object name 54 indicates the printer object to set to use the port created for the printer indicated in address 50; and the delete old port flag 54 is a boolean value indicating whether to delete the port to which the printer object was previously set before being configured to use the port accessing the printer indicated in address 50. The user could create an operation file including numerous entries for numerous physical devices for which a port is to be added and logical printer objects are to be configured. FIG. 3 provides an example of the fields in the operation file entries. Those skilled in the art will appreciate that alternative structure and naming conventions for the fields in the entries may be used with the preferred embodiments.

Figure 1A:
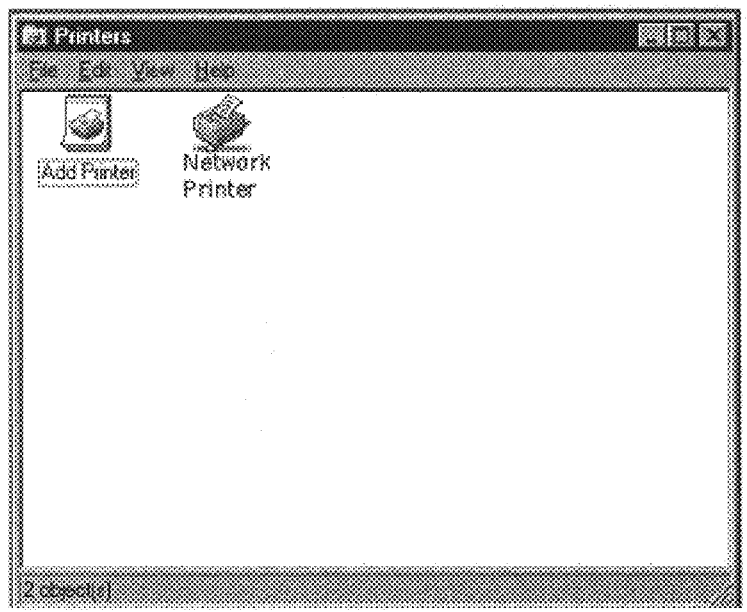
FIGS. 1a and 1b illustrate graphical user interface (GUI) windows used in the art for reconfiguring the port monitor associated with a printer object.
Figure 1B:
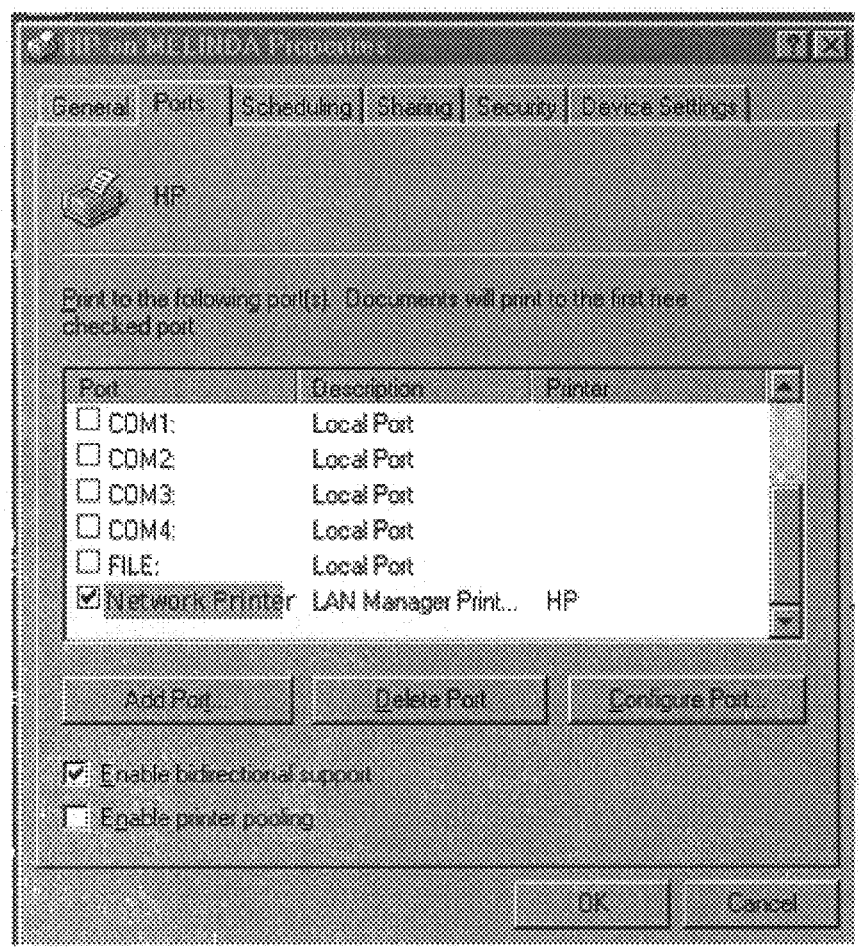
Figure 4A:
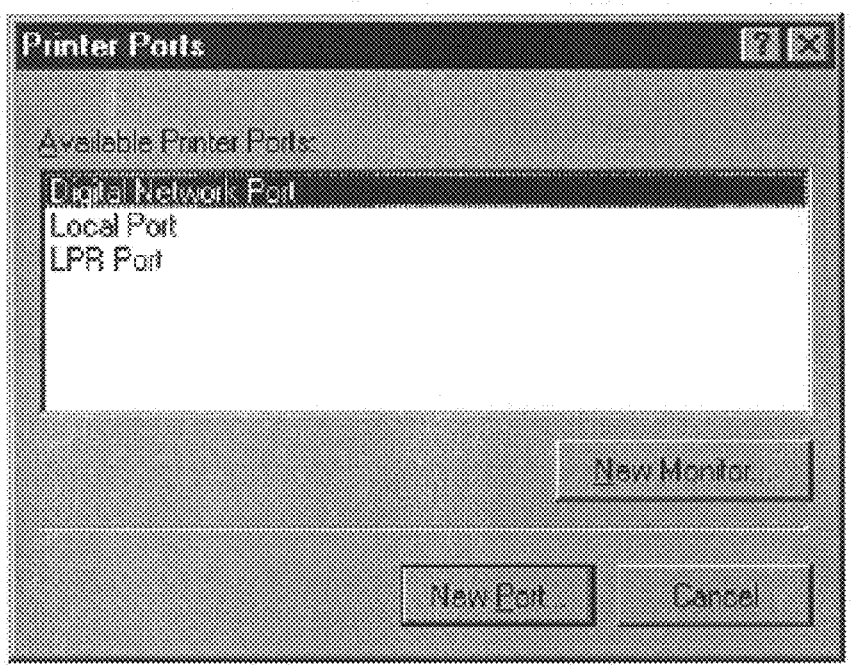
FIGS. 4a, b, c, d illustrate GUI panels a user would utilize to invoke the migration program to add new ports and reconfigure the ports used by current logical printers.
Figure 4B:
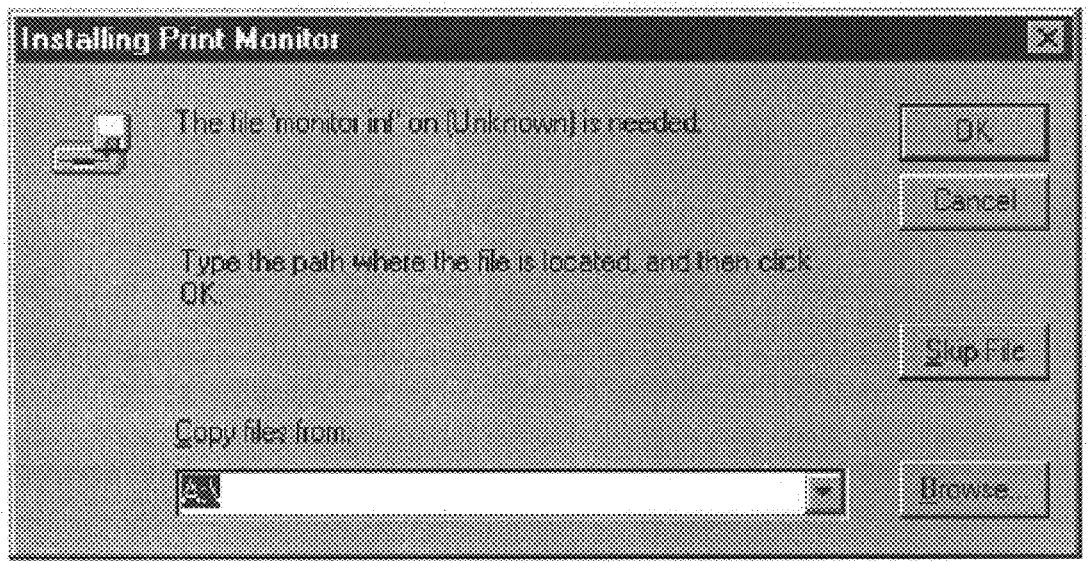
Figure 4C:
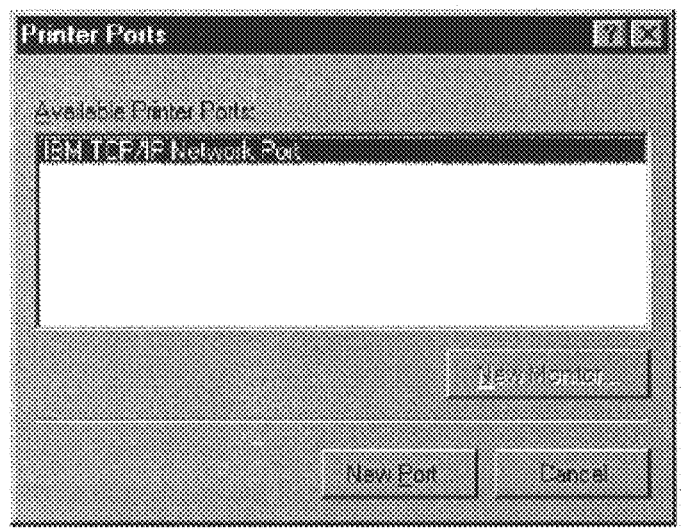

When invoking the port monitor 14 program to process the operation file, the user would specify a port monitor which would be associated with the ports being created from the entries in the operation file. The operation file may be executed as part of adding a new port monitor to the system, such as the IBM TCP/IP Network Port Monitor. In such case, the operation file is provided to configure current printer objects to work with a specified port monitor. Alternatively, the operation file may be executed to add ports and/or configure printer objects to use different ports without necessarily changing the port monitor the printer object utilizes. To reconfigure the settings, the user would access the window in FIG. 1b and select the "Add Port" button, which would display the Printer Ports window shown in FIG. 4a. To add a port, the user would select the New Port button for a selected port monitor to display the window in FIG. 4d. The windows in FIGS. 4b and 4c concern operations to add a new port monitor program, described in the related application ""Method, System, And Program For Reconfiguring Logical Printers in a Network Printing System," which was incorporated by reference above. To provide the port monitor 14 the operation file to use to reconfigure the system, the user would select the second radio button in the window of FIG. 4d and then click "OK" to display another window requesting the operation file name to use to reconfigure the network printers.

Figure 4D:
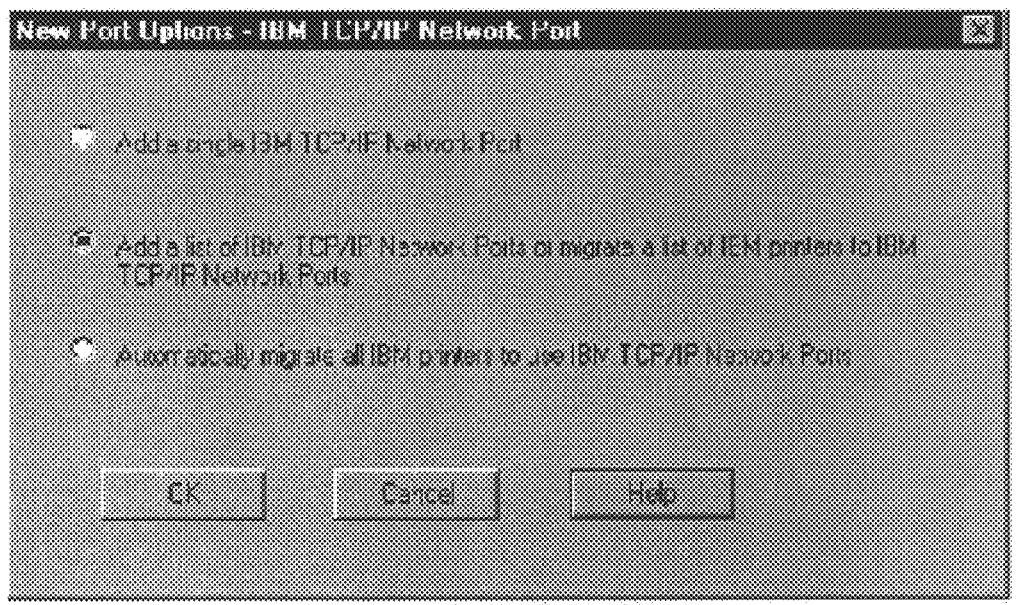
Figure 5:
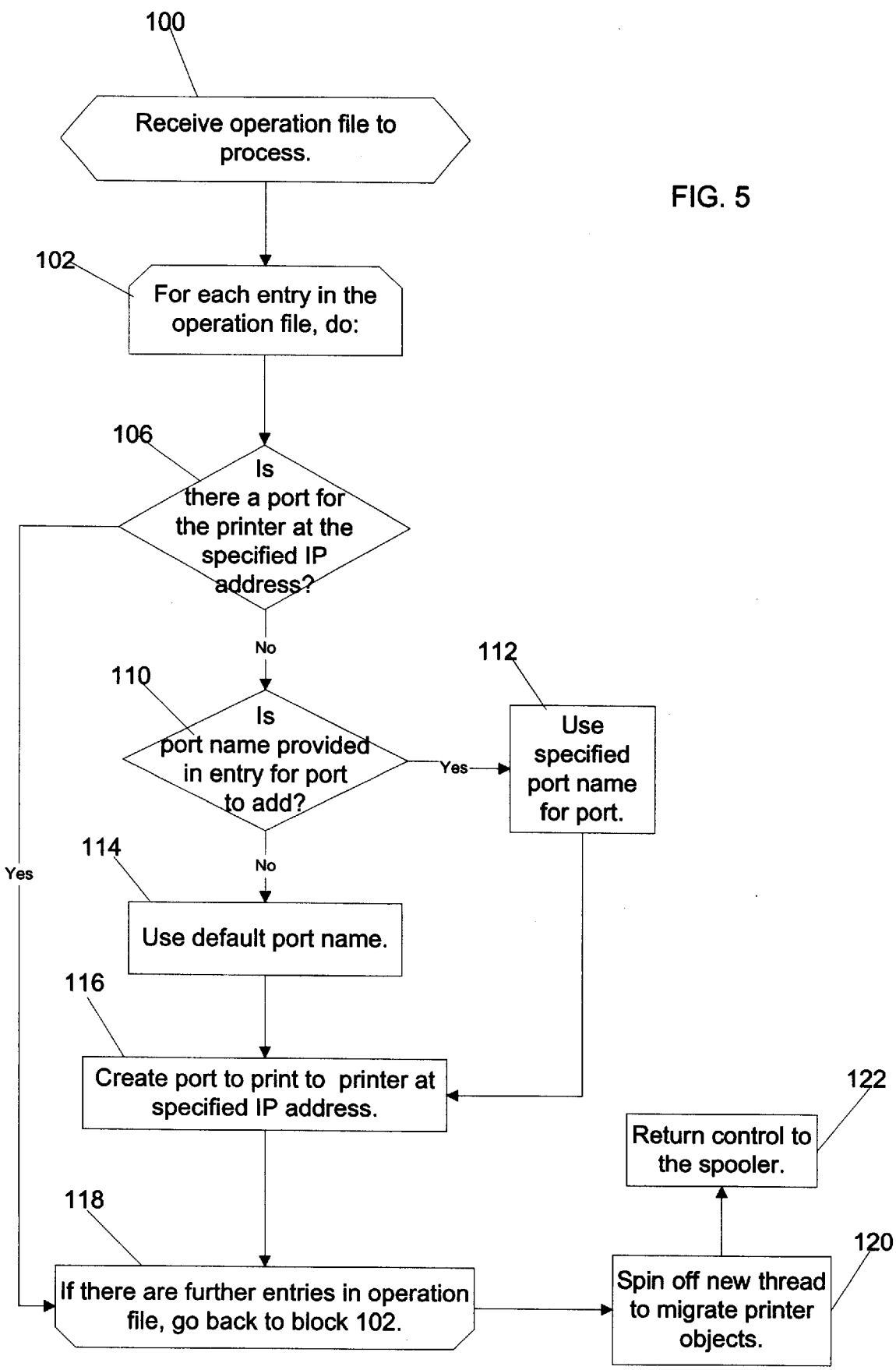
FIGS. 5 and 6 illustrate logic to add ports for new network printers and associate printer objects with different ports using the operation file in accordance with preferred embodiments of the present invention.
Figure 6:
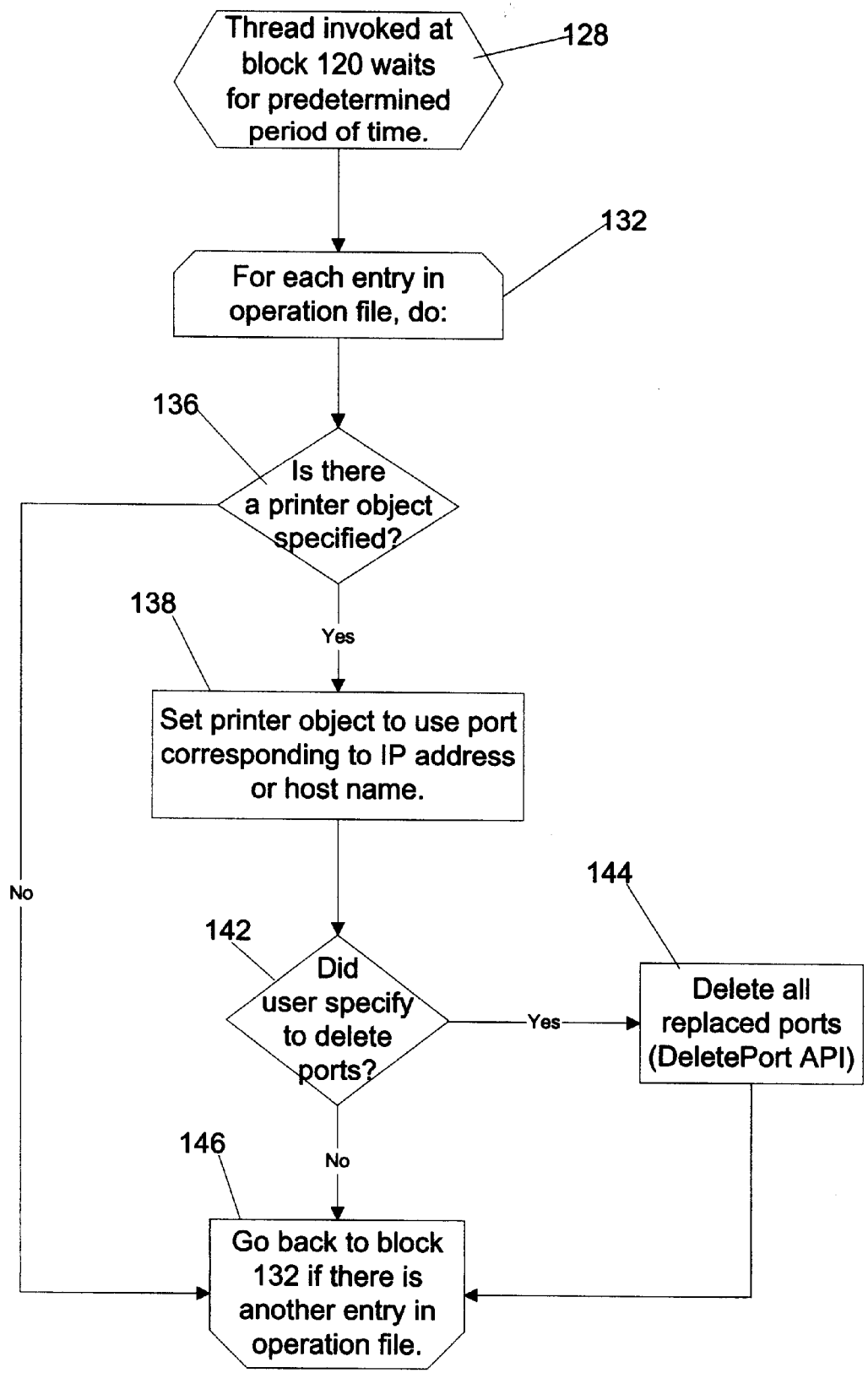

FIGS. 5 and 6 illustrate logic implemented in the port monitor 14 that is invoked from the selection of the "Add a list. . ." radio button in window FIG. 4d to automatically add new ports and reconfigure all the printer objects and physical printers specified in the operation file to use different ports. Although the description for the second radio button in FIG. 4d states that the reconfiguration is to occur with respect to the IBM TCP/IP Network Port Monitor, the reconfiguration may apply to any port monitor type that was selected when the user selected the New Port button from the window in FIG. 4a. Preferred embodiments use standard Microsoft Windows and Windows NT printer API calls to access configuration information on available printer objects. With respect to FIG. 5, control begins at block 100 with a user or network administrator providing the operation file for a specified port monitor as part of the Add Port process. For each entry in the operation file, the port monitor 14 performs a loop at block 102. The port monitor 14 determines (at block 106) whether there already is a port for the printer at the specified IP address.

If there is not a port for the printer at the specified address, then the port monitor 14 determines (at block 110) whether the entry in the operation file specifies a port name for the port to add. If so, then the port monitor 14 uses (at block 112) the name specified in the entry for the port to add; otherwise, if there is no name specified in the entry, then a default port name is used (at block 114). After determining the name to use at block 112 or 114, the port monitor 14 creates (at block 116) a port to print to the printer at the specified IP address. After the port is created, the port monitor 14 proceeds (at block 118) back to block 102 to consider any further entries in the operation file. Further, if (at block 106) there is already a port for the printer at the specified IP address, then control proceeds to block 118 to determine if there are any further entries in the operation file to consider. After processing all entries in the operation file, the port monitor 14 spins off a new thread (at block 120) to perform the operations of migrating printer objects specified in the operation file to use the specified ports and then returns control (at block 122) to the spooler 4.

The result of the logic of FIG. 5 is to create new ports using the selected port monitor for the IP addresses specified in the operation file if such ports do not exist. In Windows NT, after the Add Port process returns control to the spooler 4, the spooler 4 updates its internal structures to include information on the new ports. Because the spooler 4 does not recognize the new ports until control is returned from the Add Port process, the migration program at block 120 needs to initiate a new thread to configure printer objects to use any new ports.

With respect to FIG. 6, before executing, the new thread invoked at block 120 waits (at block 128) for a predetermined period of time to provide the spooler 4 sufficient time to update its internal data structures to recognize any new ports. Otherwise, without this delay to provide the spooler 4 time to update its files, the spooler 4 does not recognize the new ports.

After waiting, the thread then begins a loop at block 132 for each entry in the operation file. Within this loop, the thread determines (at block 134) whether the entry specifies a printer object to migrate to a port. It is possible that the entry may only include information to add a new port using the logic of FIG. 5 and not include printer object information to migrate a printer object to the port. If the entry specifies a printer object, then the port monitor 14 sets (at block 138) the specified printer object to use the port corresponding to the IP address or host name specified in field 50. The name used for the port will be the port name in field 52 if a new port was created using this name or a default name if no name is indicated in the port name field 52. Otherwise, the name of the preexisting port will be used, which could match the name in field 52. After setting the printer object to use the port providing access to the specified IP address, the port monitor 14 determines (at block 142) from the delete replaced port 56 information whether replaced ports should be deleted. If so, then the port monitor 14 deletes (at block 144) all replaced ports using the DeletePort API. If the entry does not specify to delete ports or after deleting replaced ports, the port monitor 14 proceeds (at block 146) back to block 132 if there are further entries in the operational file to consider. If, at block 136, there was not printer object specified to migrate to a new port, then control proceeds to block 146 to consider any further entries in the operation file.

In preferred embodiments, the port monitor 14 may write result and log information to a log file indicating whether a port was created for the specified IP address, whether the migration of the printer object to the new port succeeded and whether replaced ports were deleted.

Preferred embodiments thus provide a program to include in the Windows print subsystem to allow the user to provide an operation file of specified IP addresses of physical printers to add if not already recognized by the spooler 4 and printer objects to reconfigure to use the port to access the printer at the specified IP address. This allows the user to automatically reconfigure the ports with which printer objects are associated for a particular monitor, without requiring the network administrator to manually go through the printer manager dialog boxes to add a port, reassign a printer object to a new port, and delete ports. In this way, numerous new physical printers can be automatically added to the NT environment by using the operation file to specify a port to create for each new physical printer and to reconfigure the print objects specified in the entries of the operation file to use a specified port without the need for substantial user involvement to repeatedly change settings on numerous GUI panels. This is especially helpful in large network printing environments when there may be hundreds of printers that need to be added to the spooler and numerous printer objects to migrate over to use the added ports for the new printers Further, the operation file may be used repeatedly to reconfigure the printer environment. For instance, if undesired changes to the network printing configuration were made, then the administrator may have the port monitor 14 again process the operation file to configure settings to return the system to the state defined in the operation file.

Conclusions And Alternative Embodiments

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments were described with respect to adding ports and configuring printer objects to use a different port. However, the preferred embodiments may apply to programs that can configure any output devices attached to the network or computer or add ports or interfaces to provide communication with such output devices. In such case, the printer object may comprise a device object and the port may comprise a logical interface representing a connection to the output device. The output devices subject to the preferred embodiment configuration operations may be any output device known in the art capable of connecting to the computer directly, e.g., a parallel port or serial port, or through a network, such as an Intranet or the Internet. For instance preferred embodiments could apply to configuring output devices such as facsimile machines, copiers, telephones, display devices, input/output devices, storage devices, communication systems, etc., in communication with the network system.

The preferred embodiment port and printer configuration program is defined with respect to a Windows NT and 95/98 printer manager environment. However, the preferred embodiments may apply to use with other print subsystem software and operating systems using logical printers (printer objects) that map to physical printers through logical interfaces (ports).

Preferred embodiments utilize specific terms, such as printer object, port, port monitor, etc. that have specific meaning within the Microsoft Windows operating system. However, such terms as used herein also refer to their general functional purpose. For instance, the term "printer object" may refer to any logical printer to which an application program prints, the term "port" may refer to any object that provides an interface connection between a selected logical printer and a physical printer, and the term "port monitor" may refer to any program that manages and monitors the connection between the logical printer and physical printer.

The logic of FIGS. 5 and 6 is preferably implemented within the print subsystem application that displays GUI windows through which the user may affect printer settings. However, various functions may be implemented in different application programs or in the operating system of the print subsystem. This logic is for illustrative purposes. Additional or alternative steps may be performed in addition to those illustrated in the logic. Further, the order of the steps in the preferred logic may also vary.

Preferred embodiments provided specific configuration operations that may be included in the entries of the operation file. In alternative embodiments, additional configuration operations may be set at the entries of the operation file.

In summary, preferred embodiments disclose a method, system, program, and data structures for configuring output device resources including device objects, output devices, and logical interfaces to the output devices. Jobs directed to a device object are submitted to one associated output device over a network. At least one output device is associated with each device object by associating the device object with the logical interface to the output device. A file is received including a plurality of entries, wherein each entry indicates a network address of one output device. Each entry in the file is processed to create a logical interface to the output device at the network address indicated in the entry.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for configuring output device resources including device objects, output devices, and logical interfaces to the output devices, wherein jobs directed to a device object are submitted to one associated output device over a network, wherein at least one output device is associated with each device object by associating the device object with the logical interface to the output device, comprising:

receiving at a computer connected to the output devices a file created by a user and including a plurality of entries, wherein each entry indicates a network address of one output device; and processing each entry in the file to create a logical interface to the output device at the network address indicated in the entry.

2. The method of claim 1, wherein each entry further indicates one device object and wherein processing each entry in the file further comprises associating the device object indicated in the entry with the logical interface created for the entry.

3. The method of claim 2, wherein each entry is capable of indicating to delete any preexisting logical interfaces associated with the device object after the device object is associated with the logical interface to the output device indicated in the entry, wherein the deleted preexisting logical interfaces do not include the logical interface to the output device at the network address indicated in the entry.

4. The method of claim 1, wherein processing each entry in the file further comprises determining whether there is a preexisting logical interface to the output device indicated in the entry before creating the logical interface to the output device, wherein the logical interface is not created if there is a preexisting logical interface to the output device indicated in the entry.

5. The method of claim 1, wherein processing each entry in the file further comprises:

determining whether an interface name is provided in the entry; and setting the created logical interface to use the interface name if the interface name is provided in the entry.

6. The method of claim 1, wherein all the logical interfaces are created before associating the logical interfaces with the device objects.

7. The method of claim 6, further comprising invoking a thread to associate the created logical interfaces with the device objects indicated in the entries after creating the logical interfaces.

8. The method of claim 1, wherein the output device comprises a printer, the logical interface comprises a printer port, and the device object comprises a logical printer.

9. The method of claim 1, wherein the output devices are members of the set of output devices comprising: printers, facsimile machines, copiers, telephones, display devices, input/output devices, storage devices, and communication systems.

10. The method of claim 1, further comprising associating a monitor program with each created logical interface, wherein the monitor program submits jobs directed to one device object to one output device associated with the logical interface over the network.

11. A system for configuring output device resources including device objects, output devices, and logical interfaces to the output devices, wherein jobs directed to a device object are submitted to one associated output device over a network, wherein at least one output device is associated with each device object by associating the device object with the logical interface to the output device, comprising:

means for receiving at a computer connected to the output devices a file created by a user and including a plurality of entries, wherein each entry indicates a network address of one output device; and means for processing each entry in the file to create a logical interface to the output device at the network address indicated in the entry.

12. The system of claim 11, wherein each entry further indicates one device object and wherein the means for processing each entry in the file further comprises means for associating the device object indicated in the entry with the logical interface created for the entry.

13. The system of claim 12, wherein each entry is capable of indicating to delete any preexisting logical interfaces associated with the device object after the device object is associated with the logical interface to the output device indicated in the entry, wherein the deleted preexisting logical interfaces do not include the logical interface to the output device at the network address indicated in the entry.

14. The system of claim 11, wherein the means for processing each entry in the file further comprises means for determining whether there is a preexisting logical interface to the output device indicated in the entry before creating the logical interface to the output device, wherein the logical interface is not created if there is a preexisting logical interface to the output device indicated in the entry.

15. The system of claim 11, wherein the means for processing each entry in the file further comprises:

means for determining whether an interface name is provided in the entry; and means for setting the created logical interface to use the interface name if the interface name is provided in the entry.

16. The system of claim 11, wherein all the logical interfaces are created before associating the logical interfaces with the device objects.

17. The system of claim 16, further comprising means for invoking a thread to associate the created logical interfaces with the device objects indicated in the entries after creating the logical interfaces.

18. The system of claim 11, wherein the output device comprises a printer, the logical interface comprises a printer port, and the device object comprises a logical printer.

19. The system of claim 11, wherein the output devices are members of the set of output devices comprising: printers, facsimile machines, copiers, telephones, display devices, input/output devices, storage devices, and communication systems.

20. An article of manufacture for use in programming a computer to configure output device resources including device objects, output devices, and logical interfaces to the output devices, wherein jobs directed to a device object are submitted to one associated output device over a network, and wherein at least one output device is associated with each device object by associating the device object with the logical interface to the output device, comprising the article of manufacture comprising computer usable media including at least one computer program embedded therein that causes the computer to perform:

receiving at a computer connected to the output devices a file created by a user and including a plurality of entries, wherein each entry indicates a network address of one output device; and processing each entry in the file to create a logical interface to the output device at the network address indicated in the entry.

21. The article of manufacture of claim 20, wherein each entry further indicates one device object and wherein processing each entry in the file further comprises associating the device object indicated in the entry with the logical interface created for the entry.

22. The article of manufacture of claim 21, wherein each entry is capable of indicating to delete any preexisting logical interfaces associated with the device object after the device object is associated with the logical interface to the output device indicated in the entry, wherein the deleted preexisting logical interfaces do not include the logical interface to the output device at the network address indicated in the entry.

23. The article of manufacture of claim 20, wherein processing each entry in the file further comprises determining whether there is a preexisting logical interface to the output device indicated in the entry before creating the logical interface to the output device, wherein the logical interface is not created if there is a preexisting logical interface to the output device indicated in the entry.

24. The article of manufacture of claim 20, wherein processing each entry in the file further comprises:

determining whether an interface name is provided in the entry; and setting the created logical interface to use the interface name if the interface name is provided in the entry.

25. The article of manufacture of claim 20, wherein all the logical interfaces are created before associating the logical interfaces with the device objects.

26. The article of manufacture of claim 25, further comprising invoking a thread to associate the created logical interfaces with the device objects indicated in the entries after creating the logical interfaces.

27. The article of manufacture of claim 20, wherein the output device comprises a printer, the logical interface comprises a printer port, and the device object comprises a logical printer.

28. The article of manufacture of claim 20, wherein the output devices are members of the set of output devices comprising: printers, facsimile machines, copiers, telephones, display devices, input/output devices, storage devices, and communication systems.

29. The article of manufacture of claim 20, further comprising associating a monitor program with each created logical interface, wherein the monitor program submits jobs directed to one device object to one output device associated with the logical interface over the network.

30. A computer useable transmission medium accessible to a computer, including data structures comprising:

a file created by a user including a plurality of entries, wherein each entry indicates a network address of one output device, wherein each entry in the file is processed to create a logical interface to the output device at the network address indicated in the entry, and wherein at least one output device is associated with each device object by associating the device object with a logical interface to the output device.

31. The computer useable transmission medium of claim 30, wherein each entry further indicates one device object and wherein each entry in the file is further processed to associate the device object indicated in the entry with the logical interface created for the entry.

32. The computer useable transmission medium of claim 30, wherein each entry is further capable of including an interface name, wherein the created logical interface is assigned the interface name if the interface name is provided in the entry.

33. The computer useable transmission medium of claim 30, wherein each entry is capable of indicating to delete any preexisting logical interfaces associated with the device object before the device object is associated with the logical interface to the output device indicated in the entry, wherein the deleted preexisting logical interfaces do not include the logical interface to the output device at the network address indicated in the entry.

\* \* \* \* \*

UNITED STATES PATENT AND TRADEMARK OFFICE
CERTIFICATE OF CORRECTION

PATENT NO. : 6,658,498 B1
DATED : December 2, 2003
INVENTOR(S) : Dennis Michael Carney and Ryan Hoa Nguyen It is certified that error appears in the above-identified patent and that said Letters Patent is hereby corrected as shown below:

Title page,
Item [56], References Cited, U.S. PATENT DOCUMENTS, add the following:
-- U.S. Patent 5,602,974, 02/11/97, Shaw et al.
   U.S. Patent 5,678,044, 10/14/97, Pastilha et al.
   U.S. Patent 5,692,111, 11/25/97, Marbry et al.
   U.S. Patent 5,699,495, 12/26/97, Snipp
   U.S. Patent 5,742,825, 04/21/98, Mathur et al.
   U.S. Patent 5,819,112, 10/06/98, Kusters
   U.S. Patent 5,845,058, 12/01/98, Shaw et al.
   U.S. Patent application Serial No. 09/348,251, filed July 7, 1999
   U.S. Patent application Serial No. 09/349,056, filed July 7, 1999
   U.S. Patent application Serial No. 09/348,966, filed July 7, 1999
   U.S. Patent application Serial No. 09/348,358, filed July 7, 1999 --.
OTHER PUBLICATIONS, add:
-- Jacobs, John. Windows NT Printing: Flow of Control. Microsoft TechNet, Volume 4, Issue 9, Sept. 1999 [online], [retrieved on Nov. 7, 1999]. Retrieved from the Internet <URL: http://technet.microsoft.com/cdonline/content/complete/windows/winnt/winntas/technote/teroubleshooting..>.
   Microsoft Corporation. Windows NT Printing Model. Microsoft Corporation,(c)2000 [online],[retrieved on June 2, 2000]. Retrieved from the Internet <URL:http://msdn.microsoft.com/library/winresource/dnwinnt/S83B1.HTM>[Available on the Internet before 12/99].
   McLaughlin III, Leo J. Line Printer Daemon Protocol. Network Printing Working Group, rfc1179, Aug. 1990 [online], [Retrieved on June 2, 1000].
   Microsoft Corporation. Windows NT Printer Drivers. Microsoft Corporation, (c) 2000 [online], [retrieved on June 2, 2000] [Available on the Internet before 12/99]. --.

Signed and Sealed this

Seventeenth Day of January, 2006

JON W. DUDAS
*Director of the United States Patent and Trademark Office*